United States Patent [19]

Takahata

[11] Patent Number: 5,303,301
[45] Date of Patent: Apr. 12, 1994

[54] TELEPHONE APPARATUS WITH CALL-BACK INDICATION

[75] Inventor: Natsuko Takahata, Fukuoka, Japan

[73] Assignee: Matsushita Electric Industrial Co., Ltd., Japan

[21] Appl. No.: 885,955

[22] Filed: May 20, 1992

[30] Foreign Application Priority Data

May 22, 1991 [JP] Japan .................................. 3-117267

[51] Int. Cl.⁵ .................. H04M 15/00; H04M 15/06; H04M 3/42
[52] U.S. Cl. .................................... 379/142; 379/140; 379/201; 379/209
[58] Field of Search ............... 379/142, 199, 201, 131, 379/140, 209

[56] References Cited

U.S. PATENT DOCUMENTS

| | | | |
|---|---|---|---|
| 4,241,238 | 12/1980 | Strand | 379/142 |
| 4,567,323 | 1/1986 | Lottes et al. | 379/201 |
| 4,723,273 | 2/1988 | Diesel et al. | 379/142 |
| 4,907,258 | 3/1990 | Kamitomo | 379/209 |
| 5,109,405 | 4/1992 | Morganstein | 379/142 |

Primary Examiner—Stephen Chin
Assistant Examiner—Vijay Shankar
Attorney, Agent, or Firm—Parkhurst, Wendel & Rossi

[57] ABSTRACT

A telephone apparatus comprises: a telephone number data detection portion for detecting telephone number data indicative of a telephone number of a calling party sent from a telephone line; a dialing portion for dialing in response to a dialing control signal; a first storing portion for storing the detected telephone number data; a second storing portion for storing information; a first control portion responsive to a first manual operation for reading out the stored telephone number from the fist storing portion; for producing the dialing control signal to call back the party using the read out telephone number data; and for causing the second storing portion to store the information in association with the stored telephone number data, the information indicating that calling-back has been finished; an indication portion for indicating the telephone number data and the stored information; and a second control portion responsive to a second manual operation for reading out the stored telephone data from the first storing portion and the information from the second storing portion and for causing the indication portion to indicate the read out telephone number data and the information.

7 Claims, 8 Drawing Sheets

TELEPHONE APPARATUS WITH CALL-BACK INDICATION

BACKGROUND OF THE INVENTION

1. Field of the Invention

This invention relates to a telephone apparatus having a caller's telephone number recognition function.

2. Description of the Prior Art

A telephone apparatus is known which has a display for indicating a caller's telephone number using telephone number data sent together with a ring signal. In this prior art telephone apparatus, the user can know who is calling before picking up a hand set of the telephone apparatus. Moreover, it stores the telephone number data in response to a call. Then, it reads out and displays the stored telephone number data when the user operates this prior telephone apparatus.

In such a telephone apparatus, the user can dial with reference to the stored telephone data to call back a calling person.

However, in the prior art telephone apparatus mentioned above, if the user has finished calling-back with reference to the stored telephone number data, the user must remember that a calling-back operation has been finished. Therefore, there is a problem that the user may call back the calling person a second time or may forget to call back the calling person.

SUMMARY OF THE INVENTION

The present invention has been developed in order to remove the above-described drawbacks inherent to the conventional telephone apparatus.

According to the present invention there is provided a first telephone apparatus comprising: a telephone number data detection portion for detecting telephone number data indicative of a telephone number of a calling party sent from a telephone line; a dialing portion for dialing in response to a dialing control signal; a first storing portion for storing the detected telephone number data; a second storing portion for storing information; a first control portion responsive to a first manual operation for reading out the stored telephone number from the first storing portion; for producing the dialing control signal to call back the party using the read out telephone number data; and for causing the second storing portion to store the information in association with the stored telephone number data, the information indicating that calling-back has been finished; an indication portion for indicating the telephone number data and the stored information; and a second control portion responsive to a second manual operation for reading out the stored telephone data from the first storing portion and the information from the second storing portion and for causing the indication portion to indicate the read out telephone number data and the information.

According to the present invention there is also provided a second telephone apparatus as mentioned in the first telephone apparatus, further comprising: a response detection portion for detecting a response from a called party; and wherein the first control portion causes the second storing portion to store the information in association with the stored telephone number data only when the response detection portion detects the response from the party.

According to the present invention there is also provided a third telephone apparatus as mentioned in the first telephone apparatus, further comprising: a third control portion for comparing the detected telephone number with the stored telephone number and for cancelling the information stored in correspondence with the stored telephone number when the detected telephone number agrees with the stored telephone number.

According to the present invention there is further provided a fourth telephone apparatus comprising: a telephone number data detection portion for detecting telephone number data indicative of a telephone number of a calling party sent from a telephone line; an interface portion for communicating with the telephone line in response to a control signal; a dialing portion for dialing in response to a dialing control signal; a first storing portion for storing the detected telephone number data; a second storing portion for storing information; a busy signal detection portion for detecting a busy signal sent from the telephone line; a first control portion responsive to a first manual operation for reading out the stored telephone number from the first storing portion; for producing the control signal and the dialing control signal to call back the party using the read out telephone number data; and for causing the second storing portion to store the information in association with the stored telephone number data, the information indicating that calling-back has been finished in the presence of the detected busy signal; an indication portion for indicating the telephone number data and the stored information; and a second control portion responsive to a second manual operation for reading out the stored telephone data from the first storing portion and the information from the second storing portion and for causing the indication portion to indicate the read out telephone number data and the information.

According to the present invention there is also provided a fifth telephone apparatus comprising: a telephone number data detection portion for detecting telephone number data indicative of a telephone number of a calling party sent from a telephone line; a dialing portion for dialing a telephone number in response to manual operations; a first storing portion for storing the detected telephone number data; a second storing portion for storing information; a third storing portion for storing the dialed telephone number in response to the manual operation; a comparing portion for comparing the stored telephone number with the telephone number data stored in the first storing portion; a first control portion responsive to the manual operation for causing the second storing portion to store the information in association with the stored telephone number data when the stored telephone number agrees with the telephone number data stored in the first storing portion, the information indicating that calling-back has been finished; an indication portion for indicating the telephone number data and the information; and a second control portion responsive to a second manual operation for reading out the stored telephone data from the first storing portion and the information from the second storing portion and for causing the indication portion to indicate the read out telephone number data and the information.

According to the present invention there is further provided a sixth telephone apparatus comprising: an operational key switch portion for producing a key switch signal in responsive to a first manual operation of a user; a first storing portion responsive to the key switch signal for storing at least a telephone number in correspondence with the operational key switch in a first mode; a dialing portion for dialing in response a dialing control signal; a first control portion responsive to the key switch signal for causing the first storing portion to store the telephone number in the first and for reading out telephone number data stored in the registering mode and producing the dialing control signal in accordance with the stored telephone number in a second mode; a telephone number data detection portion for detecting telephone number data indicative of a telephone number of a calling party sent from a telephone line; a second storing portion for storing the detected telephone number data; a third storing portion for storing information; a comparing portion for comparing the telephone number data read from the first storing portion by the first control portion with the detected telephone number data; a second control portion responsive to an output of the comparing portion for causing the third storing portion to store the information in association with the detected telephone number data stored in the second storing portion when the read by the first control portion agrees with the detected telephone number data stored in the second storing portion, the information indicating that calling-back has been finished; an indication portion for indicating the telephone number data and the stored information; and a third control portion responsive to a second manual operation by the user for reading out the stored telephone data from the first storing portion and the information from the second storing portion and for causing the indication portion to indicate the read out telephone number data and the stored information.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment of this invention with reference to drawings.

Figure 1:
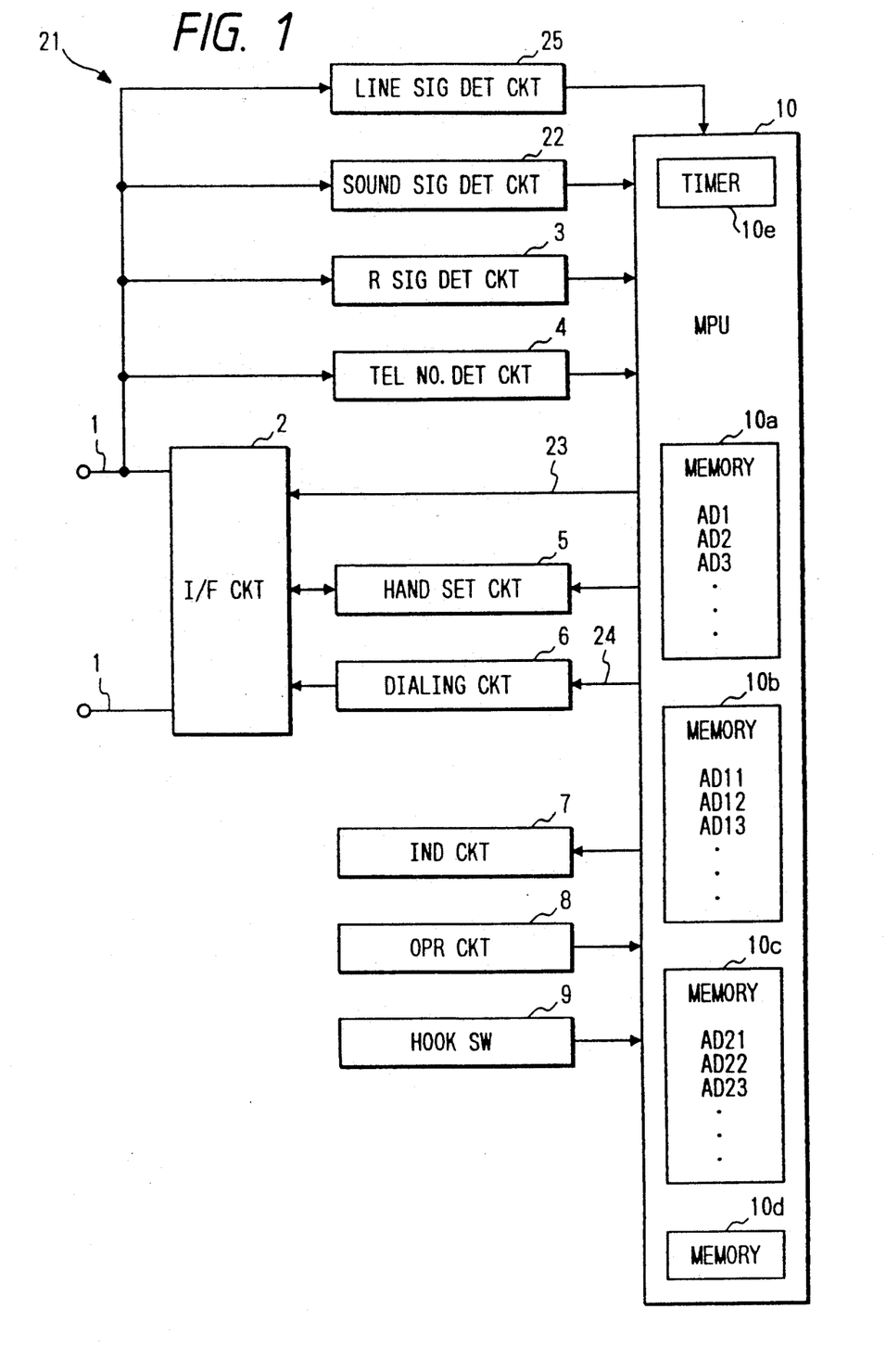
FIG. 1 is a block diagram of first and second embodiments of this invention.
Figure 4:
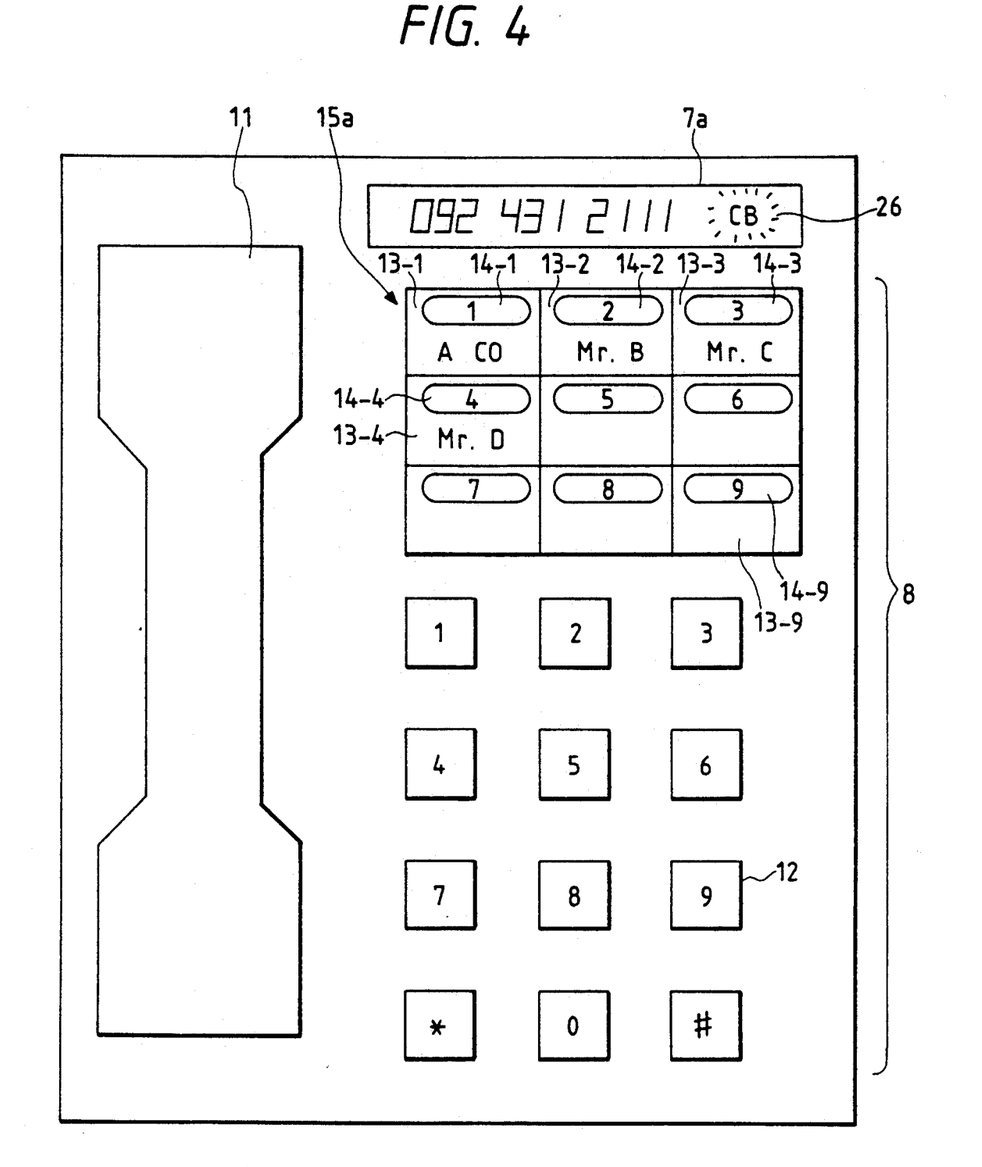
FIG. 4 is an exterior view of the first and second embodiments of the telephone apparatus.

FIG. 1 is a block diagram of first and second embodiments of a telephone apparatus of this invention. FIG. 4 is an exterior view of the first and second embodiments of the telephone apparatus.

In FIGS. 1 and 4, the telephone apparatus 21 of this embodiment is connected to telephone line 1. A ring signal detection circuit 3 connected to the telephone line 1 detects a ring signal to produce and send a ring signal detection signal to a microprocessor 10 (MPU). A telephone number data detection circuit 4 connected to the telephone line 1 detects telephone number data sent from an exchange together with the ring signal to produce and send a detected telephone number data to the microprocessor 10. A line signal detection circuit 22 is connected to the telephone line 1 and it detects a line state of the telephone line 1 by detecting a ring back signal and a busy signal. A sound signal detection circuit 25 is connected to the telephone line 1 and it detects a sound signal sent from the telephone line 1. The telephone line 1 is also connected to an well-known interface circuit 2. The interface circuit 2 performs communication with the telephone line 1 in response to a communication control signal 23 from the microprocessor 10.

A hand set circuit 5 including a hand set 11 sends a sound signal to the telephone line 1 via the interface circuit 2 and receives another sound signal sent from the telephone line 1 via the interface circuit 2. A dialing circuit 6 sends a dialing signal to the interface 2 in response to a dialing control signal 24 including telephone number data from the microprocessor 10. A indication circuit 7 indicates a caller's (calling party's) telephone number sent from the exchange and indicates information whether or not calling-back has been finished by a predetermined character on an indicator 7a.

An operation circuit 8 comprises twelve-keys 12 for normal dialing and for performing special functions. In this embodiment, indication on the display 7a is controlled by special key "#". A hook switch 9 sends an off-hook signal indicative of off/on hook of the hand set 11 to the microprocessor 10.

The microprocessor 10 includes a first memory portion 10a, a second memory portion 10b, a third memory portion 10c, a fourth memory portion 10d, and a timer 10e therein. The memory portion 10a stores at least a telephone number in response to the telephone number data detection signal from the telephone number data detection circuit 4. The second memory portion 10b stores information indicating whether calling-back has been finished with respect to a telephone number data correspondingly stored in the memory portion 10a. That is, for example, when a telephone number data is stored in the memory portion 10a at an address AD1, the information, i.e., calling-back flag, indicating whether calling-back has been finished is stored in the memory portion 10b at an address AD11. At the same address, a value of a counter mentioned later is stored. In other words, the calling-back flag and the value of the counter are stored in the memory at different bit positions. The first, second, third, and fourth memory portions 10a, 10b, 10c, and 10d are portions of a RAM built in the microprocessor 10.

In FIG. 4, the hand set 11 reproduces a sound signal from the telephone line 1 and receives a sound of a voice of the user to produce and send the sound signal to the telephone line 1 together with the hand set circuit 5. The twelve-keys 12 are used for general dialing and for controlling indication on the display 7a by the special key "#".

Figure 2:
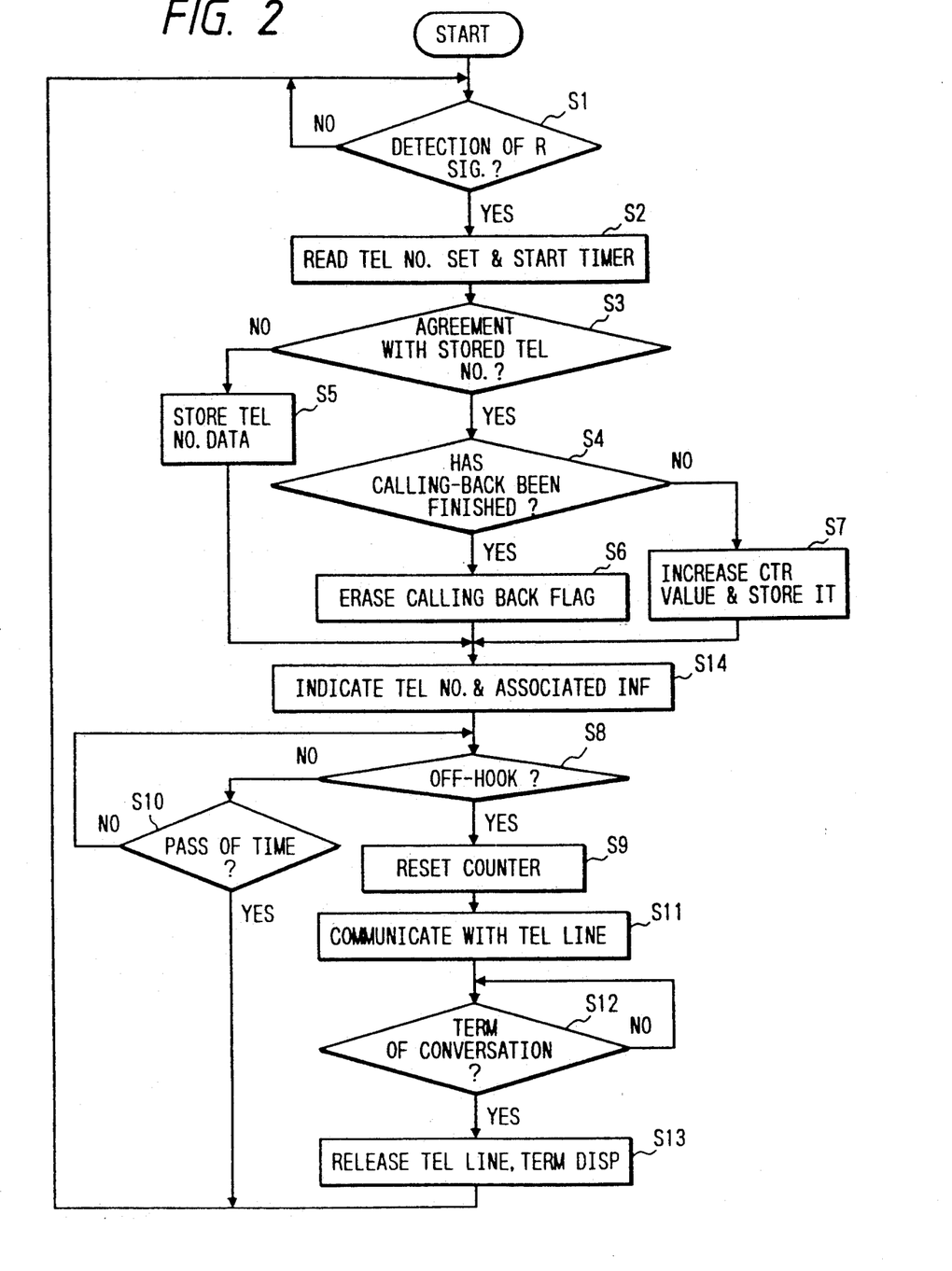
FIG. 2 shows a flow chart of the first and second embodiments.

Hereinbelow will be described operation of this embodiment. FIG. 2 shows a flow chart of the first and second embodiments. The microprocessor 10 executes a stored program whose operation is represented by the flow chart shown in FIG. 2.

In FIG. 2, processing starts at a step S1. When a ring signal comes from the telephone line 1, the ring signal detection circuit 3 detects the ring signal and it sends the ring signal detection signal to the microprocessor 10. In the step S1, the microprocessor 10 makes a decision as to whether the ring signal detection signal is present or not. If the ring signal detection signal is present, processing proceeds to the following step S2. If the answer is NO, processing loops until the microprocessor 10 detects the ring signal detection signal. The telephone number detection circuit 4 detects telephone number data sent during an interval of two consecutive ring signals and it sends the detected telephone number data to the microprocessor 10. In the step S2, the microprocessor 10 reads the detected telephone number data from the telephone number data detection circuit 4 and starts the timer 10e to measure an interval from arrival of the ring signal. That is, in the step S2, the microprocessor 10 sets a predetermined time value to the timer 10e and starts the timer 10e. For example, this predetermined time is 30 seconds. The telephone number data is sent from the exchange which is indicative of a telephone number of the calling party. In the following step S3, the microprocessor 10 compares the detected telephone number with all telephone numbers stored up to now in the memory portion 10a successively. If the detected telephone number data does not agree with any stored telephone number data, processing proceeds to step S5. In the step S5, the microprocessor sends the telephone number data to the indication circuit 7 to display the detected telephone number data on the display 7a and to the memory 10a to be stored.

In the step S3, if the detected telephone number data agrees with one of telephone numbers stored in the memory portion 10a, processing proceeds to a step S4. In the step S4, a decision is made as to whether the information indicating whether calling-back has been finished, that is, whether a calling-back flag is present by checking an address corresponding to that of the stored telephone number which agrees with the detected telephone number. For example, if the detected telephone number agrees with telephone number stored at address AD3, the microprocessor 10 checks the corresponding address AD13 to detect whether the calling-back flag has been set to "1". In the presence of the calling-back flag, processing proceeds to a step S6. In the step S6, the microprocessor 10 cancels, that is, erases the calling-back flag. That is, the microprocessor 10 stores "0" at the address AD13 of the memory portion 10b. In the absence of the calling-back flag, processing proceeds to a step S7. This means that a frequency of the call from the present caller is equal to or more than two. In the step S7, the microprocessor 10 increases a counter by one. In fact, the microprocessor 10 reads a value of the counter stored in the memory portion 10b and increases the value. Then, the microprocessor 10 stores the increased value at the same address again. After processing of the steps S5, S6, and S7, processing proceeds to a step S14. In the step S14, the microprocessor 10 causes the indication circuit 7 to display the detected telephone number data, the information indicating that calling-back has been finished, and information indicative of frequency of the arrival of the same telephone number.

The microprocessor 10 executes the processing mentioned above in response to the ring signal. Then, while the ring signal is repeatedly sent, the microprocessor 10 detects whether an off-hock action is performed by the user. That is, in a step S8, the microprocessor 10 checks whether the off-hock signal is present or not. If the microprocessor 10 detects the off-hook signal, processing proceeds to a step S8. In the step S8, the microprocessor 10 resets the counter. In fact, the microprocessor 10 store "0" in the memory portion 10b at a portion where the value of the counter is stored. In the following step S11, the microprocessor 10 causes the interface circuit 2 and the hand set circuit 5 to communicate with the telephone line 1.

In the following step S12, a decision is made as to whether the communication is terminated or not by checking the line status of the telephone line 1 using the line status detection circuit 25. If the communication is terminated, the microprocessor 10 causes the interface circuit 2 to release the telephone line 1 in a step S13. Then, processing returns to the step S1 and waits the ring signal there. In the step S8, if the off-hook signal is absent, processing proceeds to a step S10. In the step S10, a decision is made as to whether the predetermined time interval has passed by checking the timer 10e. If the predetermined time interval has not passed, processing returns to the step S8 to waits the off-hook action by the user. If the predetermined time interval has passed, processing returns to the step S1 to wait the next ring signal.

Figure 3A:
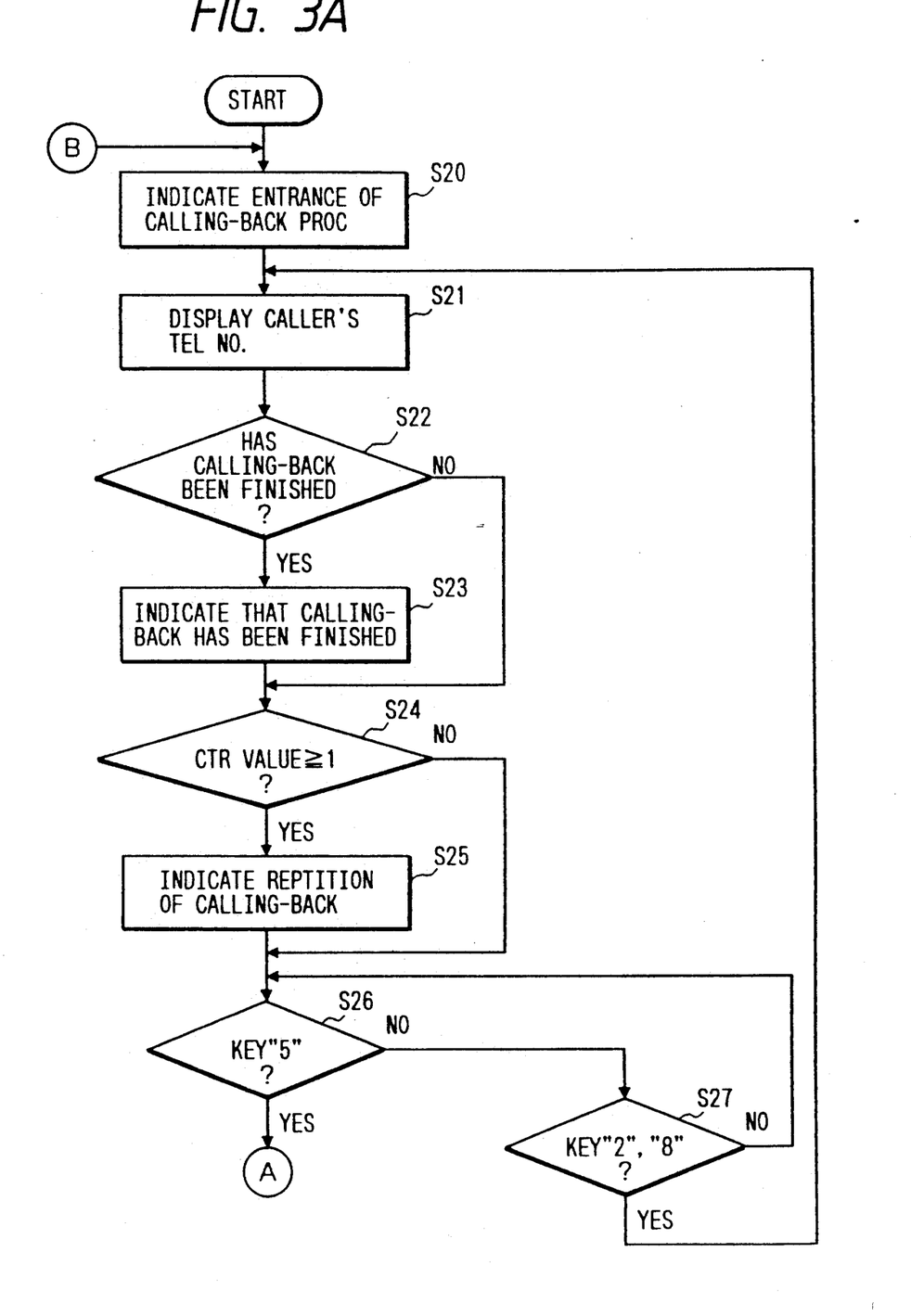
FIGS. 3A and 3B show a flow chart for calling-back of the first embodiment.
Figure 3B:
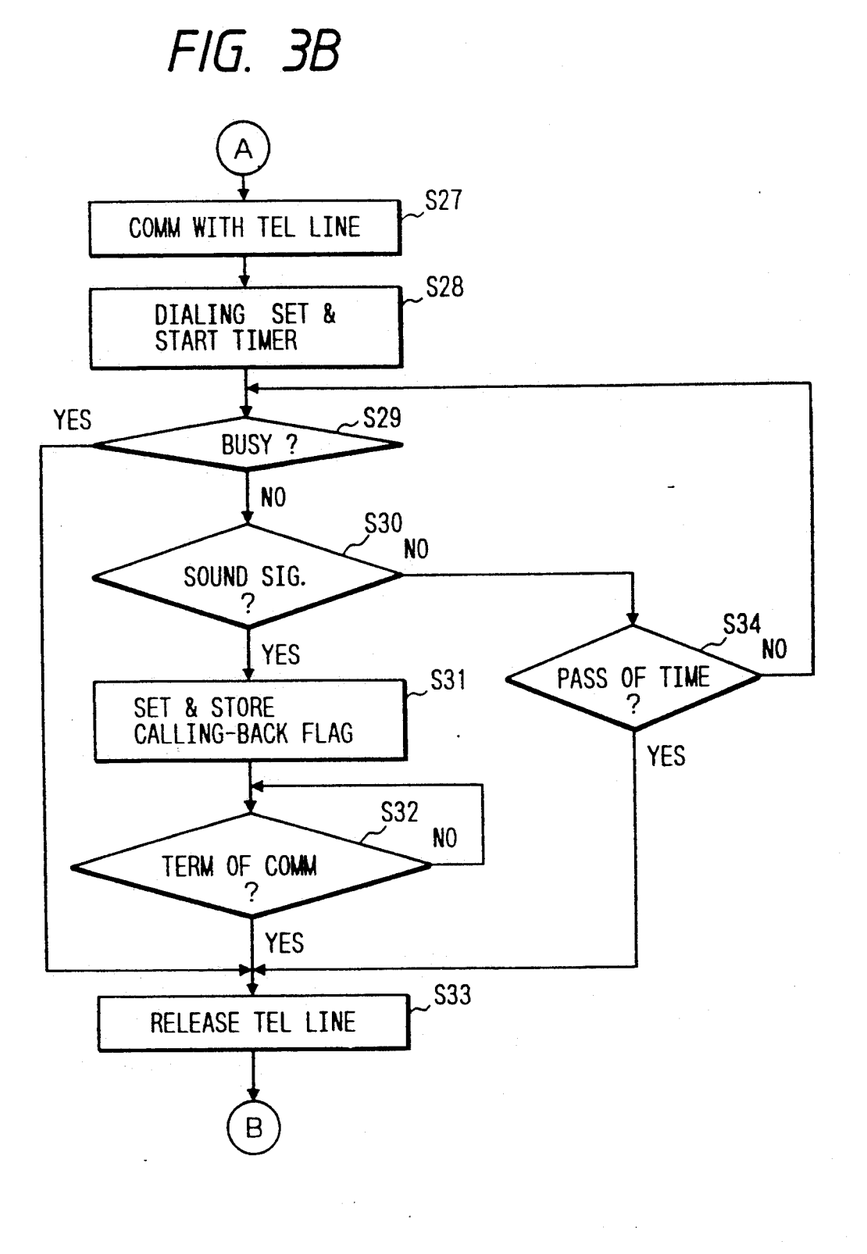

Hereinbelow will be described operation of calling-back. FIGS. 3A and 3B show a flow chart for calling-back of this embodiment.

When the user makes calling-back operation, the user depress the special key "#" and then the key "5".

Figure 5:
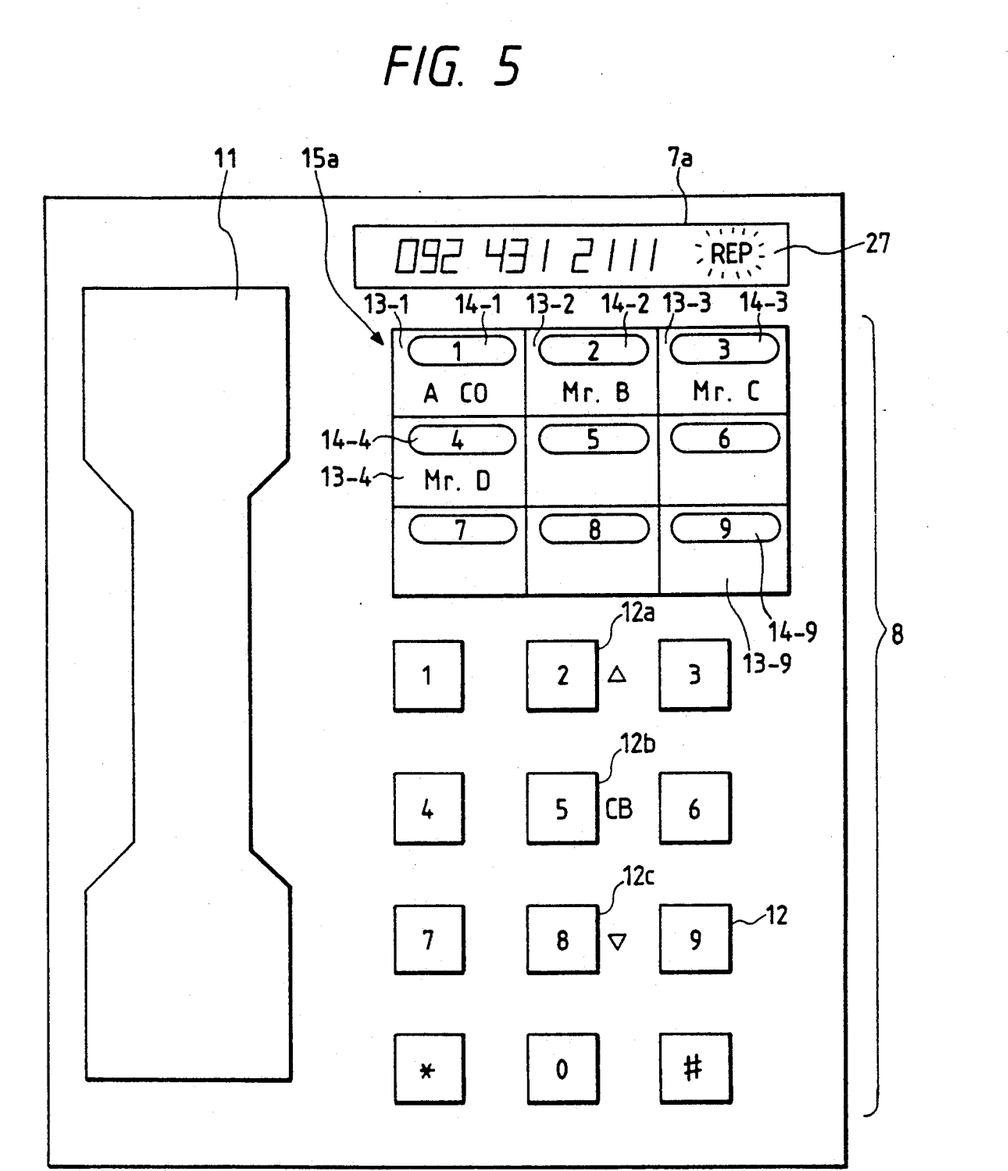
FIG. 5 is an exterior view of the first embodiment of the telephone apparatus.

When this operation is detected, the calling-back processing starts at a step S20. In a step S20, the microprocessor 10 causes the indication circuit 7 to indicate entrance of a calling-back mode on the display 7a. In the following step S10, the microprocessor 10 reads out a first stored telephone number data and displays it on the display 7a. In the succeeding step S22, a decision is made as to whether calling-back has been finished or not, that is, whether the calling-back flag has been set or reset by checking the memory portion 10b. If the calling-back flag is set, processing proceeds to a step S23. In the step S23, the microprocessor 10 causes the indication circuit to display this. That is, as shown in FIG. 4, a mark "CB" indicating that calling-back has finished is displayed after indication of the telephone number data. Then, processing proceeds to a step S24. In the step S22, if the calling-back flag is not set, this mark is not displayed and processing proceeds to the step S24 directly. In the step S24, a decision is made as to whether the value of the counter is equal to one or more. That is, the microprocessor 10 reads the value of the counter from the memory portion 10b and it detects whether the value of the counter is equal to one or more. If YES, processing proceeds to a step S25. In the step S25, the microprocessor 10 causes the indication circuit to indicate repetition of arrival of calling. FIG. 5 shows this condition. That is, "REP1" means that the number of arrival of calling is two. In the step S25, the answer is NO, processing to a step S26 directly.

Calling-back operation will be described with reference to FIG. 5. FIG. 5 is an exterior view of the first embodiment of the telephone apparatus.

In the calling-back mode, the telephone number data of at least a caller is displayed on the display 7a. In this embodiment, the display 7a can display only one line. Therefore, if there are arrivals of calling from a plurality of calling parties, all data cannot be displayed on the display 7a at once. Then, in this embodiment scroll is effected by keys "2" and "8". That is, if the key "8" is depressed, the scene of the display 7a is scrolled down. If the key "2" is depressed, the scene of the display 7a is scrolled up. Thus, the user can see all telephone data indicative of the arrivals of call by scrolling with keys "2" and "8". The user can know whether calling-back has been finished or not by the indication "CB" as shown in FIG. 4 and know how many times of arrival of the calling-backs there are as shown in FIG. 5.

Then, the calling-back processing will be described. In the following step S26, a decision is made as to whether calling-back operation is required by the user by checking the key "5" 12b. If the key "5" is not depressed, processing proceeds to a step S27. In the step S27, a decision is made as to whether keys "2" or "8" are depressed. If the key "2" or "8" are depressed, processing returns to step S21. In the step S21, if key "8" is depressed, the microprocessor 10 increases the address where the telephone number data and the address where the calling-back flag and repetition counter value are stored and display the telephone number data and information indicative of the calling-back flag and the value of the counter using the increased addresses. In the step S21, if key "2" is depressed, the microprocessor 10 decreases the address where the telephone number data and the address for calling-back flag to effect the scroll up operation.

In the step S26, the answer is YES, that is, if the key "5" is depressed, processing proceeds to a step S27 shown in FIG. 3B. In the step S27, the microprocessor 10 causes the interface circuit 2 to communicate with the telephone line 1. Thus, the user can communicate with the caller by hand set 11, through the interface circuit 2. The microprocessor 10 sends the telephone number data which is the same as the number displayed on the display 7 currently, to the dialing circuit 6 in the following step S28. Thus, the dialing circuit calls another telephone apparatus whose telephone number data is stored in this telephone apparatus. In the step S28, the microprocessor 10 sets a predetermined time value and starts the timer 10e also. This predetermined time may be the same as that in step S2 shown in FIG. 2 or can be different value. For example, 30 second is set to the timer 10e. In the following step S29, a decision is made as to whether a busy signal is detected using the line status signal detection circuit 25. In the presence of the busy signal, processing proceeds to a step S33 and the microprocessor 10 releases the telephone line 1 there. If there is no busy signal, processing proceeds to a step S30. In the step S30, the presence of a sound of voice from the called person is detected, that is, the microprocessor 10 makes a decision as to whether a sound detection signal from the sound signal detection circuit 22 is present or not. In the absence of the sound detection signal, processing proceeds to a step S34. In the step S34, a decision is made as to whether a predetermined time interval has passed or not. If the predetermined time interval has not passed, processing returns to the step 29 and checks the busy signal and the sound detection signal again. If the predetermined time interval has passed, processing proceeds to the step S33. In the step S30, if there is the sound detection signal, that is, a response of the called person is present within the predetermined time interval, the calling-back is considered to be successful, the microprocessor 10 sets a calling-back flag and stores it in the memory 10b in the step S34. That is, the information indicative of finish of calling-back operation is stored. In the following step S32, a decision is made as to whether the conversation or communication has been terminated by observing the telephone line 1 by the line signal detection circuit 25. If NO, processing loops and waits the termination of the communication until termination of the communication is detected. If YES, processing proceeds to the step S33. In the step S33, the microprocessor 10 cusses the interface circuit 2 to release the telephone line 1 by sending the control signal 23. Then, the microprocessor 10 increases the addresses for the memories 10a and 10b to display another telephone number data and the information as to call-backing and then, processing returns the step S20 to repeat this routine. In the steps S29 and S34, if there is the busy signal or the predetermined time interval has passed without the response of the called person, the microprocessor 10 does not store the information indicative of the finish of the calling-back operation. When the key "#" is depressed during this operation, interruption is executed and processing returns to the step S1 of the main routine.

As mentioned above, the telephone apparatus of this invention prevents the user from forgetting to call back the person who called the user and from calling back the person a second time due to forgetting that the user has already called back the person.

In this embodiment, this telephone apparatus judges that calling-back has not finished when the called person is absent or communicating with a third party and does not store the information indicative of the finish of the calling-back operation, i.e., calling-back flag. On the other hand, it stores the calling-back flag when the conversation with the called person is detected by the sound signal detection circuit. However, as another embodiment, calling-back operation can be considered to be finished by the detection of termination of the dialing operation executed in the step S28. That is, processing can directly proceed to the step S31 from the step S28.

Figure 6A:
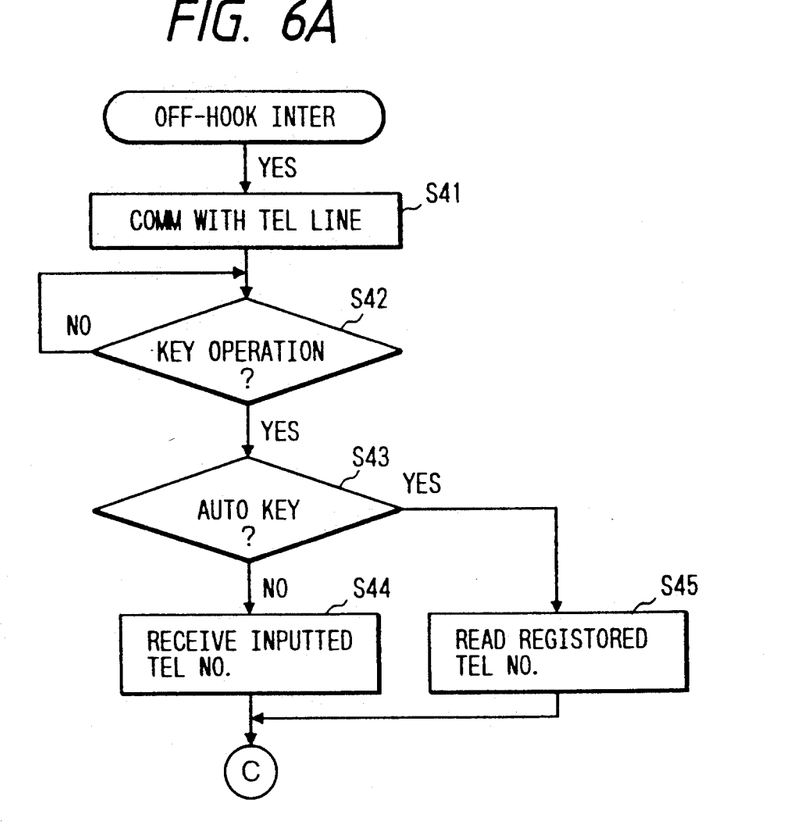
FIGS. 6A and 6B show a flow chart of the second embodiment of this invention.
Figure 6B:
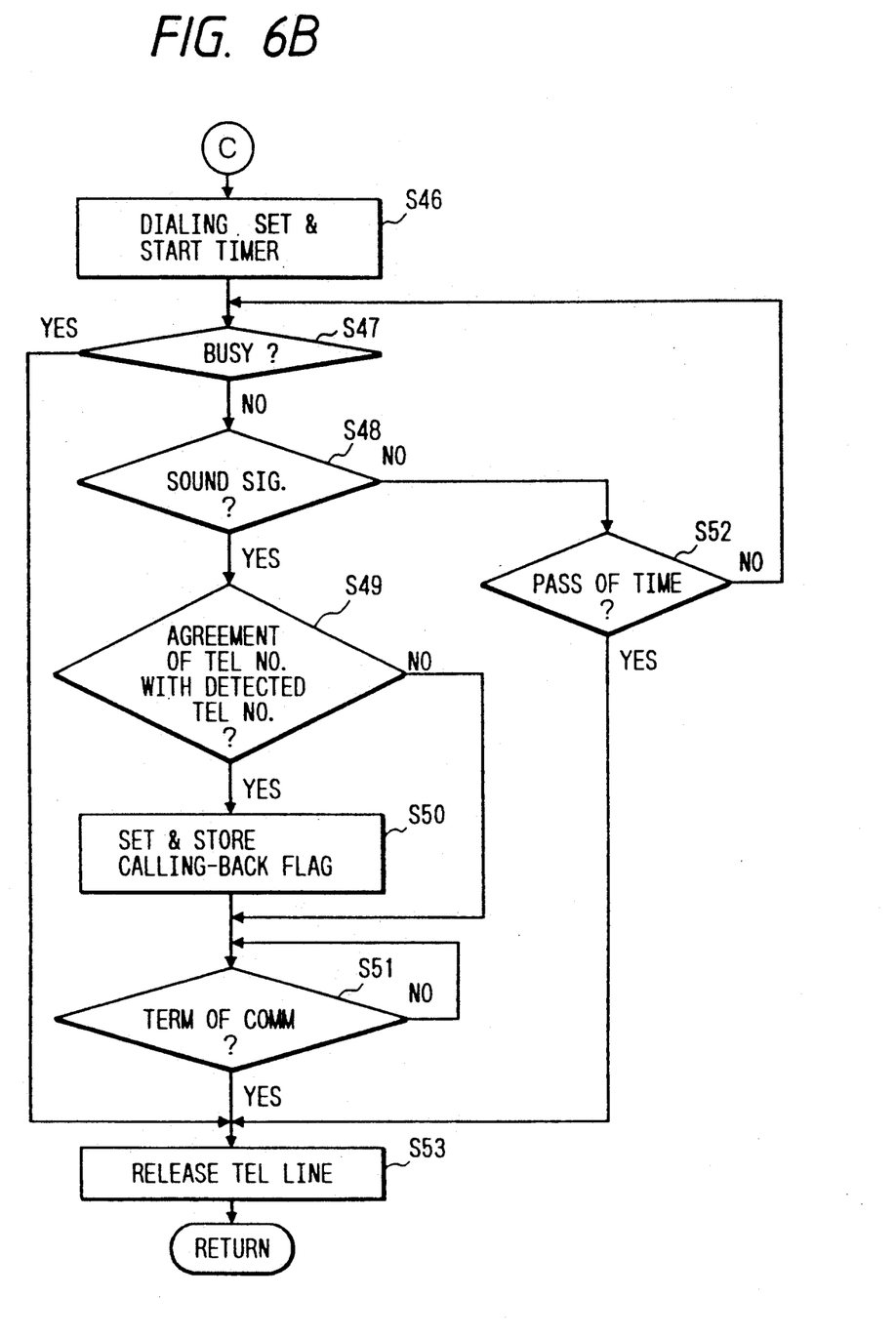

Hereinbelow will be described a second embodiment of this invention. In this embodiment, if the user calls back the person who has called by the user by means of manual dialing and when the manually dialed telephone number agrees with one of telephone number data stored in the memory 10c, the information indicative of finish of the calling-back can be stored in the memory 10b in correspondence with this telephone number data. Basic structure of this embodiment is the same as the that of the first embodiment. However, there is difference that an automatic dialing operation portion 15a included in the operation circuit 8, and the memory portion 10c are used and a stored program represented by a flow chart shown in FIGS. 6A and 6B are used in addition to the program represented by FIGS. 2, 3A, and 3B.

The operation circuit 8 includes twelve-keys 12 for the normal dialing and for registering telephone numbers for automatic dialing and automatic dialing keys (one-touch dialing key) 14-1 to 14-9 for sending key switch signals for automatic dialing to the microprocessor 10. As well known, the user registers at least a telephone number for automatic dialing by operation of the operating circuit 8. The inputted telephone number is stored in the memory 10c. For example, an automatic dialing key 14-1 produces an automatic dialing signal and sends it to the microprocessor 10. The microprocessor 10 causes the dialing circuit 6 to dial a telephone number of "A company" which was registered in the memory 10c. A telephone number of "Mr. B" marked in the name plate 13-2 is registered in correspondence with an automatic dialing key 14-2. The memory 10c comprises a RAM. However, it may comprise a ROM where telephone numbers are registered in advance.

Hereinbelow will be described an operation of this embodiment with reference to FIGS. 6A and 6B.

This routine starts in response to interruption of detection of the off-hook signal. When the microprocessor 10 detects interruption of the off-hook, processing starts in a step S41. In the step S41, the microprocessor 10 causes the interface circuit 2 to communicate with the telephone line 1. In the following step S46, the microprocessor 10 waits operation of the operation circuit 8 by the user. That is, the microprocessor 10 detects operation of the twelve-keys 12 or one of automatic dialing keys 14-1 to 14-9. If there is operation of the operation circuit 8, processing proceeds to a step S43. In the step S43, a decision is made as to whether the operated key is one of the automatic dialing keys 14-1 to 14-9 or not. If the operated key is one of the automatic dialing keys 14-1 to 14-9, processing proceeds to a step S45. In the step S45, the microprocessor 10 reads the registered telephone number which corresponds to the operated automatic dialing key. In the step S43, the answer is NO, that is, the operated key is one of the twelve keys 12, processing proceeds to a step S44. In the step S44, the microprocessor 10 receives successively inputted telephone number and stores it in the memory 10d. After processing of the steps S44 and S45, processing proceeds a step S46 shown in FIG. 6B.

In the step S46, the microprocessor 10 sets a predetermined time value and starts the timer 10e also. This predetermined time may be the same as that in step S2 shown in FIG. 2 or can be different value. For example, 30 second is set to the timer 10e. In the following step S47, a decision is made as to whether a busy signal is detected using the line status signal detection circuit 25. In the presence of the busy signal, processing proceeds to a step S53 and the microprocessor 10 releases the telephone line 1 there. If there is no busy signal, processing proceeds to a step S48. In the step S48, the presence of a sound of voice from the called person is detected, that is, the microprocessor 10 makes a decision as to whether a sound detection signal from the sound signal detection circuit 22 is present or not. In the absence of the sound detection signal, processing proceeds to a step S52. In the step S52, a decision is made as to whether the predetermined time interval has passed or not. If the predetermined time interval has not passed, processing returns to the step S47 and checks the busy signal and the sound detection signal again. If the predetermined time interval has passed, processing proceeds to the step S53. In the step S48, if there is the sound detection signal, that is, a response of the called person is present within the predetermined time interval, the calling-back is considered to be successful, processing proceeds to a step S49. In the step S49, a decision is made as to whether the telephone number dialed agrees with any of telephone numbers stored in the memory 10a, that is the inputted telephone number by the twelve keys 12 or telephone number read by one of automatic dialing keys 14-1 to 14-9 agrees with the stored telephone number which was detected on the arrival of the ring signal. If the answer is NO, processing proceeds to a step S51 directly. If the answer is YES, processing proceeds to a step S50. In the step S50, the microprocessor 10 sets the calling-back flag and stores it the memory 10b. That is, the information indicative of finish of calling-back operation is stored. In the following step S51, a decision is made as to whether the conversation or communication has been terminated by observing the telephone line 1 by the line signal detection circuit 25. If NO, processing loops and waits the termination of the communication until termination of the communication is detected, If YES, processing proceeds to the step S53. In the step S53, the microprocessor 10 causes the interface circuit 2 to release the telephone line 1 by sending the control signal 23. In the steps S47 and S52, if there is the busy signal or the predetermined time interval has passed without the response of the called person, the microprocessor 10 does not store the information indicative of the finish of the calling-back operation. After processing of the step S53, processing returns to the main routine shown in FIG. 2.

What is claimed is:
1. A telephone apparatus comprising:
  (a) telephone number data detection means for detecting telephone number data indicative of a telephone number of a party sent from a telephone line;
  (b) dialing means for dialing in response to a dialing control signal;
  (c) first storing means for storing said detected telephone number data;
  (d) second storing means for storing information;
  (e) first control means responsive to a fist manual operation for reading out said stored telephone number from said first storing means; for producing said dialing control signal to call back said party using the read out telephone number data; and for causing said second storing means to store said information in association with said stored telephone number data, said information indicating that calling-back has been finished;
  (f) indication means for indicating said telephone number data and said stored information; and
  (g) second control means responsive to a second manual operation for reading out said stored telephone number data from said first storing means and said information from said second storing means and for causing said indication means to indicate said read out telephone number data and said information.

2. A telephone apparatus as claimed in claim 1, further comprising:
  response detection means for detecting a response from said party after being called back; and
  wherein said first control means causes said second storing means to store said information in association with said stored telephone number data only when said response detection means detects said response from said party.

3. A telephone apparatus as claimed in claim 1, further comprising:
  third control means for comparing said detected telephone number with said stored telephone number and for cancelling said information stored in correspondence with said stored telephone number when said detected telephone number agrees with said stored telephone number.

4. A telephone apparatus comprising:
  (a) telephone number data detection means for detecting telephone number data indicate of a telephone number of a party sent from a telephone line;
  (b) interface means for communicating with said telephone line in response to a control signal;
  (c) dialing means for dialing in response to a dialing control signal;

(d) first storing means for storing said detected telephone number data;

(e) second storing means for storing information;

(f) busy signal detection means for detecting a busy signal sent from said telephone line;

(g) first control means responsive to a first manual operation for reading out said stored telephone number from said first storing means; for producing said dialing control signal to call back said party using the read out telephone number data; and for causing said second storing means to store said information in association with said stored telephone number data, said information indicating that calling-back has been finished in the presence of the detected busy signal;

(h) indication means for indicating said telephone number data and said stored information; and (i) second control means responsive to a second manual operation for reading out said stored telephone number data from said first storing means and said information from said second storing means and for causing said indication means to indicate said read out telephone number data and said information.

5. A telephone apparatus as claimed in claim 4, wherein said first control means produces said control signal to cause said interface means to release said telephone line in response to said detected busy signal.

6. A telephone apparatus comprising:

(a) telephone number data detection means for detecting telephone number data indicative of a telephone number of a party sent from a telephone line;

(b) dialing means for dialing a telephone number in response to a first manual operation;

(c) first storing means for storing said detected telephone number data;

(d) second storing means for storing information;

(e) third storing means for storing said dialed telephone number in response to said first manual operation;

(f) comparing means for comparing said stored telephone number with said telephone number data stored in the first storing means;

(g) first control means responsive to said manual operation for causing said second storing means to store said information in association with said stored telephone number data when said stored telephone number agrees with said telephone number data stored in the first storing means, said information indicating that calling-back has been finished;

(h) indication means for indicating said telephone number data and said stored information; and (i) second control means responsive to a second manual operation for reading out said stored telephone number data from said first storing means and said information from said second storing means and for causing said indication means to indicate said read out telephone number data and said information.

7. A telephone apparatus comprising:

(a) operational key switch means for producing a key switch signal in response to a first manual operation of a user;

(b) first storing means responsive to said key switch signal for storing at least a telephone number in correspondence with said operational key switch in a first mode;

(c) dialing means for dialing in response to a dialing control signal;

(d) first control means responsive to said key switch signal for causing said first storing means to store said telephone number in said first storing means and for reading out telephone number data stored in said first mode and producing said dialing control signal in accordance with said stored telephone number in a second mode;

(e) telephone number data detection means for detecting telephone number data indicative of a telephone number of a calling party sent from a telephone line;

(f) second storing means for storing said detected telephone number data;

(g) third storing means for storing information;

(h) comparing means for comparing said telephone number data read from said first storing means by said first control means with said detecting telephone number data;

(i) second control means responsive to an output of said comparing means for causing said third storing means to store said information in association with said detected telephone number data stored in the second storing means when said telephone number data read from said first storing means by said first control means agrees with said detected telephone number data stored in the second storing means, said information indicating that calling-back has been finished;

(j) indication means for indicating said telephone number data and said stored information; and (k) third control means responsive to a second manual operation by said user for reading out said stored telephone data from said first storing means and said information from said second storing means and for causing said indication means to indicate said read out telephone number data and said stored information.

* * * * *